(12) United States Patent
Han et al.

(10) Patent No.: US 11,066,490 B2
(45) Date of Patent: Jul. 20, 2021

(54) CYANOETHYL GROUP-CONTAINING POLYMER AND PREPARATION METHOD THEREOF

(71) Applicant: LG Chem, Ltd., Seoul (KR)

(72) Inventors: Hye Soo Han, Daejeon (KR); Min Ah Kang, Daejeon (KR); Kyung An Kwon, Daejeon (KR); Dong Jo Ryu, Daejeon (KR); Seon Hee Han, Daejeon (KR); Cheol Hoon Choi, Daejeon (KR)

(73) Assignee: LG Chem, Ltd.

( * ) Notice: Subject to any disclaimer, the term of this patent is extended or adjusted under 35 U.S.C. 154(b) by 366 days.

(21) Appl. No.: 16/082,410

(22) PCT Filed: Nov. 30, 2017

(86) PCT No.: PCT/KR2017/013948
§ 371 (c)(1),
(2) Date: Sep. 5, 2018

(87) PCT Pub. No.: WO2018/124509
PCT Pub. Date: Jul. 5, 2018

(65) Prior Publication Data
US 2019/0085102 A1 Mar. 21, 2019

(30) Foreign Application Priority Data
Dec. 27, 2016 (KR) .................. 10-2016-0179851

(51) Int. Cl.
| C08F 8/30 | (2006.01) |
| C08F 216/14 | (2006.01) |
| C08F 216/06 | (2006.01) |
| C08K 3/22 | (2006.01) |
| C08J 7/04 | (2020.01) |
| H01M 50/403 | (2021.01) |
| H01M 50/411 | (2021.01) |
| H01M 50/431 | (2021.01) |
| H01M 50/449 | (2021.01) |
| C08J 7/043 | (2020.01) |
| C08F 16/06 | (2006.01) |
| H01M 10/42 | (2006.01) |

(52) U.S. Cl.
CPC .............. *C08F 8/30* (2013.01); *C08F 16/06* (2013.01); *C08F 216/06* (2013.01); *C08F 216/14* (2013.01); *C08J 7/043* (2020.01); *C08J 7/0427* (2020.01); *C08K 3/22* (2013.01); *H01M 10/4235* (2013.01); *H01M 50/403* (2021.01); *H01M 50/411* (2021.01); *H01M 50/431* (2021.01); *H01M 50/449* (2021.01); *C08J 2323/06* (2013.01); *C08J 2429/04* (2013.01); *C08K 2003/2227* (2013.01)

(58) Field of Classification Search
CPC .......... C08F 8/30; C08F 16/06; C08F 216/02; C08F 216/14; C08J 7/0427; C08J 7/043
See application file for complete search history.

(56) References Cited

U.S. PATENT DOCUMENTS

| 2,341,553 | A | 2/1944 | Houtz |
| 2,941,990 | A | 6/1960 | Schuller |
| 3,194,798 | A | 7/1965 | Frost |
| 8,771,880 | B2 | 7/2014 | Fukui et al. |
| 2009/0286188 | A1 | 11/2009 | Hatakeyama et al. |
| 2011/0064988 | A1 | 3/2011 | Yu |
| 2012/0258348 | A1 | 10/2012 | Hayakawa et al. |
| 2012/0258349 | A1 | 10/2012 | Hayakawa et al. |
| 2012/0258350 | A1 | 10/2012 | Fukui et al. |
| 2012/0259067 | A1 | 10/2012 | Fukui et al. |
| 2016/0204406 | A1 | 7/2016 | Ryu et al. |

FOREIGN PATENT DOCUMENTS

| CN | 100400551 | C | 7/2008 |
| CN | 102942645 | B | 9/2014 |
| EP | 2508538 | A1 | 10/2012 |
| GB | 575626 | A | 2/1946 |
| JP | S63023903 | A | 2/1988 |
| JP | H06202350 | A | 7/1994 |
| JP | H08025980 | B2 | 3/1996 |
| JP | 2009301007 | A | 12/2009 |
| JP | 2011213782 | A | 10/2011 |
| JP | 2012510704 | A | 5/2012 |
| JP | 2012224851 | A | 11/2012 |
| JP | 2016155898 | A | 9/2016 |
| JP | 2016534531 | A | 11/2016 |
| KR | 20120113676 | A | 10/2012 |
| KR | 101532815 | B1 | 6/2015 |
| KR | 101623101 | B1 | 5/2016 |
| KR | 101634416 | B1 | 6/2016 |
| KR | 101671556 | B1 | 11/2016 |
| KR | 20160129598 | A | 11/2016 |
| RU | 2436803 | C2 | 12/2011 |

OTHER PUBLICATIONS

Search report from International Application No. PCT/KR2017/013948, dated Mar. 13, 2018.
Li, X. et al. "Synthesis and Hydrolysis of β-Cyanoethyl Ether of Poly(vinyl alcohol)," Journal of Applied Polymer Science, vol. 73, accepted Feb. 9, 1999, pp. 2771-2777.
Database CA [Online] Chemical Abstracts Service, Columbus, Ohio, US; Apr. 22, 2001 (Apr. 22, 2001) Tsuruta, Motohiro et al: "Polyvinyl 2-cyanoethyl ether. I. Synthesis and its properties", retrieved from STN Database accession No. 1952:2471 XP002789118 (Abstract Only).
Extended European Search Report including Written Opinion for Application No. EP17889265.9 dated Mar. 6, 2019.
Tsuruta, Motohiro et al: "Polyvinyl 2-cyanoethyl ether. I. Synthesis and its properties", Kobunshi Kagaku, vol. 7, Issue 64, pp. 129-131, Dec. 15, 1950, XP009511347 (Abstract Only Attached).

*Primary Examiner* — Peter D. Mulcahy
(74) *Attorney, Agent, or Firm* — Lerner, David, Littenberg, Krumholz & Mentlik, LLP

(57) ABSTRACT

A cyanoethyl group-containing polymer and a preparation method thereof are provided. The cyanoethyl group-containing polymer is characterized by having very low contents of functional groups other than cyanoethyl groups.

7 Claims, No Drawings

US 11,066,490 B2

CYANOETHYL GROUP-CONTAINING POLYMER AND PREPARATION METHOD THEREOF

CROSS-REFERENCE TO RELATED APPLICATIONS

The present application is a national phase entry under 35 U.S.C. § 371 of International Application No. PCT/KR2017/013948 filed Nov. 30, 2017, which claims priority from Korean Patent Application No. 10-2016-0179851 filed Dec. 27, 2016, the disclosures of which are incorporated herein by reference.

BACKGROUND ART

In manufacturing a secondary battery, a safety reinforced separator (SRS) is used, which is one of methods of improving stability of the battery. The SRS is obtained by coating a polymer film such as polyethylene (PE) or polypropylene (PP) with inorganic particles, in which the inorganic particles interfere with heat shrinkage of the polymer film and maintain the shape of the separator even at a high temperature to maintain the role of separating a positive electrode and a negative electrode from each other.

Meanwhile, upon manufacturing the SRS, a binder is used in order to adhere the inorganic particles to the polymer film. Binders currently used for this purpose include 2-cyanoethyl group-containing polymers. These polymers act as an adhesive for adhering inorganic particles to the polymer film, and also as a dispersant for dispersing the inorganic particles upon coating the polymer film with the inorganic particles.

If the inorganic particles are not uniformly distributed on the polymer film, a localized area where inorganic particles are not distributed may cause heat shrinkage. Accordingly, it is necessary to develop a binder that is useful both as an adhesive and a dispersant.

DISCLOSURE

Technical Problem

The present invention provides a cyanoethyl group-containing polymer.

Further, the present invention provides a method of preparing the cyanoethyl group-containing polymer.

Technical Solution

Hereinafter, a cyanoethyl group-containing polymer and a preparation method thereof according to specific embodiments of the present invention will be described.

According to an embodiment of the present invention, a cyanoethyl group-containing polymer is provided, in which the cyanoethyl group-containing polymer includes 1.0% or less of a repeating unit containing —$OCH_2CH_2CONH_2$ and ions thereof and 2.0% or less of a repeating unit containing —$OCH_2CH_2COOH$ and ions thereof with respect to total repeating units included in the polymer.

Based on experimental results, the present inventors confirmed that when a cyanoethyl group-containing polymer having low contents of specific functional groups is used as a binder for a safety reinforced separator (SRS), a dispersion force of inorganic particles is improved and adhesive strength of the inorganic particles to a polymer film is reinforced, thereby completing the present invention.

In this description, the content of the specific functional group included in the polymer is defined as a ratio of a repeating unit containing the specific functional group with respect to total repeating units included in the polymer. In this regard, the total repeating units included in the polymer means the average number of the total repeating units included in the polymer (i.e. degree of polymerization), and the repeating unit containing the specific functional group means the average number of the repeating unit containing the specific functional group included in the polymer. For example, if the average number of a repeating unit containing —$OCH_2CH_2CONH_2$ per polymer having a degree of polymerization of 100 is 1, the polymer is defined to include 1.0% of the repeating unit containing —$OCH_2CH_2CONH_2$ with respect to the total repeating units included in the polymer.

The cyanoethyl group-containing polymer may include —$OCH_2CH_2CONH_2$ and ions thereof in a very small amount, or may not include —$OCH_2CH_2CONH_2$ and ions thereof.

Specifically, the cyanoethyl group-containing polymer may include 1.0% or less, i.e., 0% to 1.0% of the repeating unit containing —$OCH_2CH_2CONH_2$ and ions thereof with respect to the total repeating units included in the polymer. When the repeating unit is included within this range, a binder capable of uniformly fixing inorganic particles to a polymer film by improving a dispersion force of the inorganic particles may be provided.

—$OCH_2CH_2CONH_2$ may be a functional group which is introduced due to a side reaction when cyanoethyl groups are introduced into the polymer by cyanoethylation. —$OCH_2CH_2CONH_2$ may exist in a form of —$OCH_2CH_2CONH_3^+$ or —$OCH_2CH_2CONH^-$ depending on the environment where the cyanoethyl group-containing polymer is placed. Therefore, when a total ratio of the repeating unit containing —$OCH_2CH_2CONH_2$ and —$OCH_2CH_2CONH_3^+$ and —$OCH_2CH_2CONH^-$ which are ions thereof is within the above range, the above-described effect may be achieved.

The cyanoethyl group-containing polymer may include —$OCH_2CH_2COOH$ and ions thereof in a very small amount, or may not include —$OCH_2CH_2COOH$ and ions thereof.

Specifically, the cyanoethyl group-containing polymer may include 2.0% or less, i.e., 0% to 2.0% of the repeating unit containing —$OCH_2CH_2COOH$ and ions thereof with respect to the total repeating units included in the polymer. When the repeating unit is included within this range, a binder capable of uniformly fixing inorganic particles to a polymer film by improving a dispersion force of the inorganic particles may be provided.

—$OCH_2CH_2COOH$ may be a functional group which is introduced due to a side reaction when cyanoethyl groups are introduced into the polymer by cyanoethylation. —$OCH_2CH_2COOH$ may exist in a form of —$OCH_2CH_2COO^-$ depending on the environment where the cyanoethyl group-containing polymer is placed. Therefore, when a total ratio of the repeating unit containing —$OCH_2CH_2COOH$ and —$OCH_2CH_2COO^-$ which is an ion thereof is within the above range, the above-described effect may be achieved.

The cyanoethyl group-containing polymer may be, for example, cyanoethyl polysaccharides such as cyanoethyl pullulan, cyanoethyl cellulose, cyanoethyl dihydroxypropyl pullulan, cyanoethyl hydroxyethyl cellulose, cyanoethyl hydroxypropyl cellulose, cyanoethyl dihydroxypropyl cellulose, or cyanoethyl starch; or cyanoethyl polyvinyl alcohols. Among them, cyanoethyl polyvinyl alcohol is advantageous in that it is able to strongly fix inorganic particles to a polymer film and has flexibility, and therefore cracking does not easily occur even when a separator is bent or folded.

When the cyanoethyl group-containing polymer is cyanoethyl polyvinyl alcohol, the cyanoethyl polyvinyl alcohol may include a repeating unit represented by the following Chemical Formula 1.

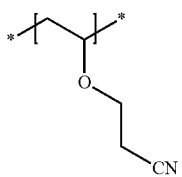

[Chemical Formula 1]

Further, the cyanoethyl polyvinyl alcohol may include a repeating unit represented by the following Chemical Formula 2, if a ratio of replacement by cyanoethyl groups is not 100%.

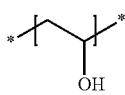

[Chemical Formula 2]

Further, the cyanoethyl polyvinyl alcohol may include repeating units represented by the following Chemical Formulae 3 and 4 in a very small amount, or may not include repeating units represented by the following Chemical Formulae 3 and 4.

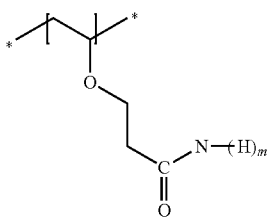

[Chemical Formula 3]

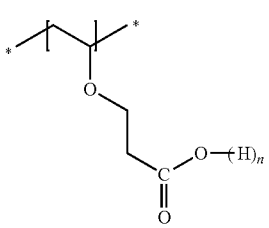

[Chemical Formula 4]

In Chemical Formulae 3 and 4, m is an integer of 1 to 3, and n is 0 or 1.

Specifically, the cyanoethyl group-containing polymer may include 1.0% or less, i.e., 0% to 1.0% of the repeating unit represented by Chemical Formula 3 and 2.0% or less, i.e., 0% to 2.0% of the repeating unit represented by Chemical Formula 4 with respect to the total amount of the repeating units represented by Chemical Formulae 1 to 4. Within the above range, the cyanoethyl group-containing polymer achieving the above-described effect may be provided.

Meanwhile, according to another embodiment of the present invention, a method of preparing the above-described cyanoethyl group-containing polymer having low contents of the specific functional groups is provided.

Specifically, the method of preparing the above-described cyanoethyl group-containing polymer includes the step of preparing the cyanoethyl group-containing polymer from a reactive functional group-containing polymer through cyanoethylation of the reactive functional group-containing polymer and a cyanoethyl group-introducing precursor. In this regard, side reactions whereby the above-mentioned specific functional groups are produced may be suppressed by maintaining solubilities of the reactants at an excellent level.

More specifically, a solvent may be added during the cyanoethylation so that Ra calculated by the following Equation 1 is less than 6:

$$(Ra)^2 = 4(\delta_{D2} - \delta_{D1})^2 + (\delta_{P2} - \delta_{P1})^2 + (\delta_{H2} - \delta_{H1})^2 \quad \text{[Equation 1]}$$

wherein $\delta_{D2}$, $\delta_{P2}$, and $\delta_{H2}$ represent a solubility parameter due to a dispersion force, a solubility parameter due to a dipolar intermolecular force, and a solubility parameter due to hydrogen bonding of a mixture obtained by mixing the reactive functional group-containing polymer and the cyanoethyl group-introducing precursor at a molar ratio of 100-x:x, respectively, and x represents a ratio of replacement by cyanoethyl groups, which is measured at any one point, and $\delta_{D1}$, $\delta_{P1}$, and $\delta_{H1}$ represent a solubility parameter due to a dispersion force, a solubility parameter due to a dipolar intermolecular force, and a solubility parameter due to hydrogen bonding of a solvent system which is used in the cyanoethylation at any one point, respectively.

Ra is a distance between Hansen solubility parameters of a solvent and a solute. A smaller Ra corresponds to a greater affinity between the solvent and the solute, indicating that the solute is readily dissolved in the solvent.

In the preparation method, therefore, Ra is employed to maintain the solubilities of the reactants at excellent levels.

In Equation 1, $\delta_D$, $\delta_P$, and $\delta_H$ represent a solubility parameter due to a dispersion force, a solubility parameter due to a dipolar intermolecular force, and a solubility parameter due to hydrogen bonding, respectively.

In Equation 1, $\delta_{D2}$, $\delta_{P2}$, and $\delta_{H2}$ represent solubility parameters of reactants at a particular point. Practically, the reactants collected during cyanoethylation include a variety of by-products in addition to the precursor and the product. Therefore, when physical properties of the reactants are measured by using the reactants directly collected during the reaction, there is a problem of low accuracy, reliability, and reproducibility.

Accordingly, the present inventors measured a ratio of replacement by cyanoethyl groups at any one point, and then mixed the reactive functional group-containing polymer and the cyanoethyl group-introducing precursor at a ratio corresponding to the ratio of replacement by cyanoethyl groups, and calculated solubility parameters of the mixture thus obtained, which were used as physical properties representing solubility parameters of the reactants at a particular point. For example, if the ratio of replacement by cyanoethyl groups at any one point is 30%, solubility parameters of the reactants at that point are replaced by solubility parameters of a mixture prepared by mixing the reactive functional group-containing polymer and the cyanoethyl group-introducing precursor at a molar ratio of 70:30.

Meanwhile, $\delta_{D1}$, $\delta_{P1}$, and $\delta_{H1}$ represent a solubility parameter due to a dispersion force, a solubility parameter due to a dipolar intermolecular force, and a solubility parameter due to hydrogen bonding of a solvent system which is used in the cyanoethylation, respectively.

The solvent system includes a solvent which does not directly participate in cyanoethylation but is used to dissolve or disperse the precursor. Further, the solvent system may include a precursor which directly participates in cyanoethylation and exists in a liquid phase at room temperature (about 25° C.) to dissolve or disperse other precursors.

A solubility parameter of a mixture including two or more substances, such as the precursor mixture or the solvent system, may be calculated by the following Equation 2:

$$\delta_{[mixture]} = \{(\delta_{[substance\ 1]}*a) + (\delta_{[substance\ 2]}*b) + \ldots + (\delta[substance\ n]*n)\} / (a+b+\ldots+n)$$  [Equation 2]

wherein a, b, . . . n represent a weight ratio of substance 1, substance 2, . . . substance n, respectively.

Equation 2 is an equation for calculating a solubility parameter of a mixture including n kinds of substances, and the solubility parameter of the mixture may be obtained by dividing the sum of values, each value obtained by multiplying a solubility parameter ($\delta_{[substance\ 1]}$, $\delta_{[substance\ 2]}$, ... $\delta_{[substance\ n]}$) of each substance by a weight ratio (a, b, . . . n) of each substance, by the sum of the weight ratios of all substances.

The reactive functional group-containing polymer may be a hydroxyl group-containing polymer. Specifically, when polysaccharides such as pullulan, cellulose, dihydroxypropyl pullulan, hydroxyethyl cellulose, hydroxypropyl cellulose, dihydroxypropyl cellulose, starch, etc., or polyvinyl alcohols are used as the reactive functional group-containing polymer, it is possible to prepare the above-described various kinds of cyanoethyl group-containing polymers.

As the cyanoethyl group-introducing precursor, various kinds of precursors known in the art to which the present invention pertains may be used. Specifically, acrylonitrile may be used as the cyanoethyl group-introducing precursor.

The cyanoethylation may be performed in the presence of a basic catalyst. The basic catalyst may include caustic soda (NaOH), sodium carbonate ($NaCO_3$), or a mixture thereof.

In the preparation method, a solvent that exhibits high solubility for the precursor used in the cyanoethylation and the product may be used. In the preparation method, for example, water (distilled water), alcohol solvents, ketone solvents, sulfoxide solvents, or mixed solvents thereof may be used. Specifically, the alcohol solvents may include methyl alcohol, ethyl alcohol, n-propyl alcohol, isopropyl alcohol, n-butyl alcohol, isobutyl alcohol, t-butyl alcohol, n-pentyl alcohol, n-hexyl alcohol, a mixture thereof, etc., the ketone solvents may include methyl ethyl ketone, acetone, a mixture thereof, etc., and the sulfoxide solvents may include dimethyl sulfoxide, etc.

The cyanoethylation may be performed at a temperature of about 10° C. to about 60° C. for about 40 minutes to about 500 minutes. Within this range, side reactions whereby the above-described functional groups are produced may be minimized.

In the preparation method, the solvent may be added during the cyanoethylation so that Ra calculated by Equation 1 is less than 6, as described above. In this regard, a kind and a content of the solvent to be added may be determined depending on a kind and a content of the precursor to be used, a ratio of replacement by a cyanoethyl group, and a kind and a content of the solvent injected at the beginning of the reaction.

As an example, a method of preparing cyanoethyl polyvinyl alcohol by the preparation method will be described in detail.

For the preparation of cyanoethyl polyvinyl alcohol, polyvinyl alcohol may be used as the reactive functional group-containing polymer, and acrylonitrile may be used as the cyanoethyl group-introducing precursor.

Therefore, in the method of preparing cyanoethyl polyvinyl alcohol, polyvinyl alcohol, acrylonitrile, the basic catalyst, and a first solvent are mixed to prepare a mixture, and during cyanoethylation of the mixture, a second solvent is added to provide cyanoethyl polyvinyl alcohol having low contents of the above-described specific functional groups.

In the present description, the solvent introduced before the reaction is referred to as the 'first solvent' and the solvent introduced during the reaction is referred to as the 'second solvent' in order to distinguish the solvent introduced before the reaction from the solvent introduced during the reaction. The first solvent generally refers to one kind of solvent as well as a mixed solvent of two or more solvents, and the second solvent also refers to one kind of solvent as well as a mixed solvent of two or more solvents.

The first solvent may be appropriately selected so that Ra represented by Equation 1 is less than 6.

Specifically, since the ratio of replacement by cyanoethyl groups is 0% at the beginning of the reaction, a solubility parameter due to a dispersion force, a solubility parameter due to a dipolar intermolecular force, and a solubility parameter due to hydrogen bonding of polyvinyl alcohol (a molar ratio of polyvinyl alcohol and acrylonitrile=100:0) are put into $\delta_{D2}$, $\delta_{P2}$, and $\delta_{H2}$ of Equation 1, respectively.

Since the solubility parameter due to a dispersion force, the solubility parameter due to a dipolar intermolecular force, and the solubility parameter due to hydrogen bonding of polyvinyl alcohol are 15.90 $MPa^{1/2}$, 8.10 $MPa^{1/2}$, and 18.80 $MPa^{1/2}$, 15.90, 8.10, and 18.80 are put into $\delta_{D2}$, $\delta_{P2}$, and $\delta_{H2}$ of Equation 1, respectively.

Further, a solubility parameter due to a dispersion force, a solubility parameter due to a dipolar intermolecular force, and a solubility parameter due to hydrogen bonding of a solvent system which exists in a liquid phase at room temperature and includes acrylonitrile and the first solvent are put into $\delta_{D1}$, $\delta_{P1}$, and $\delta_{H1}$ of Equation 1. Therefore, the first solvent may be appropriately selected so that Ra calculated by Equation 1 is less than 6.

The first solvent may include water (distilled water), alcohol solvents, ketone solvents, sulfoxide solvents, or mixed solvents thereof. Specifically, the alcohol solvents may include methyl alcohol, ethyl alcohol, n-propyl alcohol, isopropyl alcohol, n-butyl alcohol, isobutyl alcohol, t-butyl alcohol, n-pentyl alcohol, n-hexyl alcohol, a mixture thereof, etc., the ketone solvents may include methyl ethyl ketone, acetone, a mixture thereof, etc., and the sulfoxide solvents may include dimethyl sulfoxide, etc.

Among them, water is used alone as the first solvent. If a mixed solvent of water and an organic solvent is used as the first solvent, the organic solvent may be used in an amount of more than 0 parts by weight and less than 100 parts by weight with respect to 100 parts by weight of acrylonitrile.

After an appropriate solvent is selected as the first solvent, polyvinyl alcohol, acrylonitrile, the basic catalyst, and the first solvent are mixed, and this mixture is stirred at about 10° C. to about 60° C. for about 40 minutes to about 500 minutes to perform cyanoethylation. While the cyanoethylation is performed, the Ra value calculated by Equation 1 is monitored and the second solvent may be added so that Ra does not exceed 6.

Specifically, the ratio of replacement by cyanoethyl groups may be obtained by H-NMR during the cyanoethylation. Specifically, when hydroxyl groups of polyvinyl alcohol are replaced by cyanoethyl groups, a peak corresponding to —CH$_2$CN appears at 2.5 ppm to 2.8 ppm, and a peak corresponding to —CH$_2$— which is a main chain derived from polyvinyl alcohol appears at 1.3 ppm to 2.0 ppm. Therefore, the ratio of replacement by cyanoethyl groups may be calculated from a percentage of the peak area appearing at 2.5 ppm to 2.8 ppm to the peak area appearing at 1.3 ppm to 2.0 ppm.

Ratio of replacement by cyanoethyl groups (%)=
(peak area of 2.5~2.8 ppm)/(peak area of
1.3~2.0 ppm)*100     [Equation 3]

Subsequently, solubility parameters of the mixture which is obtained by mixing the precursors at a ratio corresponding to the ratio of replacement by cyanoethyl groups are calculated. For example, the precursor mixture is prepared, and solubility parameters of the precursor mixture according to the ratio of replacement by cyanoethyl groups in polyvinyl alcohol may be calculated by Equation 2, and the results are as in the following Table 1.

TABLE 1

| Ratio of replacement by cyanoethyl groups | Molar ratio of PVA and AN* | | $\delta_{D2}$ | $\delta_{P2}$ | $\delta_{H2}$ |
|---|---|---|---|---|---|
| (%) | PVA | AN | (MPa$^{1/2}$) | (MPa$^{1/2}$) | (MPa$^{1/2}$) |
| 0 | 100 | 0 | 15.90 | 8.10 | 18.80 |
| 10 | 90 | 10 | 15.91 | 8.57 | 17.60 |
| 20 | 80 | 20 | 15.92 | 9.04 | 16.40 |
| 30 | 70 | 30 | 15.93 | 9.51 | 15.20 |
| 40 | 60 | 40 | 15.94 | 9.98 | 14.00 |
| 50 | 50 | 50 | 15.95 | 10.45 | 12.80 |
| 60 | 40 | 60 | 15.96 | 10.92 | 11.60 |
| 70 | 30 | 70 | 15.97 | 11.39 | 10.40 |
| 80 | 20 | 80 | 15.98 | 11.86 | 9.20 |
| 90 | 10 | 90 | 15.99 | 12.33 | 8.00 |
| 100 | 0 | 100 | 16.00 | 12.80 | 6.80 |

*PVA: polyvinyl alcohol; AN: acrylonitrile

Further, solubility parameters of the solvent system at the corresponding point are calculated. These values are put into Equation 1 to confirm Ra value. If the Ra value is increased, the second solvent may be added to decrease the Ra value.

For example, in the method of preparing cyanoethyl polyvinyl alcohol, alcohol solvents, ketone solvents, sulfoxide solvents, or a mixed solvent thereof may be added as the second solvent. Specifically, the alcohol solvents may include methyl alcohol, ethyl alcohol, n-propyl alcohol, isopropyl alcohol, n-butyl alcohol, isobutyl alcohol, t-butyl alcohol, n-pentyl alcohol, n-hexyl alcohol, a mixture thereof, etc., the ketone solvents may include methyl ethyl ketone, acetone, a mixture thereof, etc., and the sulfoxide solvents may include dimethyl sulfoxide, etc.

Further, in the method of preparing cyanoethyl polyvinyl alcohol, the second solvent may be added two or more times within the range of 25% to 85% of the ratio of replacement by cyanoethyl groups so that Ra of Equation 1 is controlled to less than 6.

Specifically, in the method of preparing cyanoethyl polyvinyl alcohol, the second solvent may be added in an amount of 30 parts by weight to 70 parts by weight with respect to 100 parts by weight of the first solvent within the range of 25% to 35% of the ratio of replacement by cyanoethyl groups, and the second solvent may be added in an amount of 30 parts by weight to 130 parts by weight with respect to 100 parts by weight of the first solvent within the range of 45% to 55% of the ratio of replacement by cyanoethyl groups, so that Ra of Equation 1 is controlled to less than 6. If necessary, the second solvent may be added in an amount of 30 parts by weight to 130 parts by weight with respect to 100 parts by weight of the first solvent within the range of 75% to 85% of the ratio of replacement by cyanoethyl groups.

The method of preparing cyanoethyl polyvinyl alcohol has been described in detail, but the preparation method of the present invention may also be applied to methods of preparing many different kinds of cyanoethyl group-containing polymers. The cyanoethyl group-containing polymer prepared according to the preparation method of the present invention may include functional groups such as —OCH$_2$CH$_2$CONH$_2$ and —OCH$_2$CH$_2$COOH in a very small amount or may not include the same, and therefore, the cyanoethyl group-containing polymer may be used as a binder for an SRS (safety reinforced separator) to improve a dispersion force of inorganic particles and to reinforce adhesive strength of inorganic particles to a polymer film.

Meanwhile, according to still another embodiment, a separator including the above-described cyanoethyl group-containing polymer having low contents of the specific functional groups and a secondary battery including the separator are provided. The separator and the secondary battery may be fabricated in a manner known in the art to which the present invention pertains, except that the above-described cyanoethyl group-containing polymer is used.

The separator may include a polymer film, inorganic particles distributed on the polymer film, and a binder capable of fixing the inorganic particles on the polymer film, in which the binder may include the above-described cyanoethyl group-containing polymer having low contents of the specific functional groups.

The cyanoethyl group-containing polymer may include functional groups such as —OCH$_2$CH$_2$CONH$_2$ and —OCH$_2$CH$_2$COOH in a very small amount or may not include the same, and therefore, the cyanoethyl group-containing polymer may reinforce dispersion force and adhesive strength of the inorganic particles and may unfirmly distribute and strongly adhere the inorganic particles on the polymer film. The secondary battery may include the separator, thereby exhibiting excellent stability.

Effect of the Invention

A cyanoethyl group-containing polymer according to an embodiment of the present invention may have very low contents of functional groups other than the cyanoethyl group, and therefore, the cyanoethyl group-containing polymer may be used as a binder for an SRS (safety reinforced separator) to improve a dispersion force of inorganic particles and to reinforce adhesive strength of inorganic particles to a polymer film.

DETAILED DESCRIPTION OF THE EMBODIMENTS

Hereinafter, actions and effects of the present invention will be described in more detail with reference to specific examples of the present invention. However, these examples are for illustrative purposes only, and the scope of the present invention is not intended to be limited by these examples.

EXAMPLE 1

Preparation of Cyanoethyl Group-Containing Polymer 100 g of a 20% by weight polyvinyl alcohol aqueous solution (20 g of polyvinyl alcohol, 80 g of distilled water), 2 g of a 30% by weight NaOH aqueous solution (0.6 g of NaOH, 1.4 g of distilled water), and 150 g of acrylonitrile were added to a reaction vessel, and stirred at 30° C. to allow cyanoethylation.

A ratio of replacement by cyanoethyl groups was monitored through H-NMR, and when the ratio of replacement by cyanoethyl groups was 30%, 30 g of acetone was added to the reaction vessel.

Referring to Table 1, it was confirmed that when the ratio of replacement by cyanoethyl groups was 30%, $\delta_{D2}$, $\delta_{P2}$, and $\delta_{H2}$ of Equation 1 were 15.93 MPa$^{1/2}$, 9.51 MPa$^{1/2}$, and 15.20 MPa$^{1/2}$, respectively. Meanwhile, when the ratio of replacement by cyanoethyl groups was 30%, acetone was added, and at this time, $\delta_{D1}$, $\delta_{P1}$, and $\delta_{H1}$ of Equation 1 were 15.78 MPa$^{1/2}$, 13.54 MPa$^{1/2}$, and 18.19 MPa$^{1/2}$, respectively. When these solubility parameters were put into Equation 1, it was confirmed that Ra was 5.03 and less than 6 at 30% of the ratio of replacement by cyanoethyl groups.

When the ratio of replacement by cyanoethyl groups reached 50% by continuing the cyanoethylation, 30 g of acetone was further added to the reaction vessel.

Referring to Table 1, it was confirmed that when the ratio of replacement by cyanoethyl groups was 50%, $\delta_{D2}$, $\delta_{P2}$, and $\delta_{H2}$ of Equation 1 were 15.95 MPa$^{1/2}$, 10.45 MPa$^{1/2}$, and 12.80 MPa$^{1/2}$, respectively. Further, when the ratio of replacement by cyanoethyl groups was 50%, acetone was added, and at this time, $\delta_{D1}$, $\delta_{P1}$, and $\delta_{H1}$ of Equation 1 were 15.75 MPa$^{1/2}$, 13.22 MPa$^{1/2}$, and 17.19 MPa$^{1/2}$, respectively. When these solubility parameters were put into Equation 1, it was confirmed that Ra was 5.20 and less than 6 at 50% of the ratio of replacement by cyanoethyl groups.

30 minutes later, 3 g of acetic acid was added to the reaction vessel, and 300 g of distilled water was added to precipitate a reaction product. The precipitated polymer was dissolved in 200 g of acetone, and this solution was added to 300 g of distilled water to reprecipitate the cyanoethyl group-containing polymer. Ra values were monitored throughout the cyanoethylation to confirm that Ra values were maintained at less than 6.

EXAMPLE 2

Preparation of Cyanoethyl Group-Containing Polymer

A cyanoethyl group-containing polymer was prepared in the same manner as in Example 1, except that the reaction temperature of Example 1 was controlled to 50° C. Ra values were monitored throughout the cyanoethylation to confirm that Ra values were maintained at less than 6.

EXAMPLE 3

Preparation of Cyanoethyl Group-Containing Polymer

A cyanoethyl group-containing polymer was prepared in the same manner as in Example 1, except that when the ratio of replacement by cyanoethyl groups was 80%, 100 g of acetone was further added to the reaction vessel of Example 1. Ra values were maintained at about 5.52 throughout the cyanoethylation, indicating that Ra values were less than 6.

EXAMPLE 4

Preparation of Cyanoethyl Group-Containing Polymer 100 g of a 20% by weight polyvinyl alcohol aqueous solution (20 g of polyvinyl alcohol, 80 g of distilled water), 2 g of a 30% by weight NaOH aqueous solution (0.6 g of NaOH, 1.4 g of distilled water), and 150 g of acrylonitrile were added to a reaction vessel, and stirred at 30° C. to allow cyanoethylation.

A ratio of replacement by cyanoethyl groups was monitored through H-NMR, and when the ratio of replacement by cyanoethyl groups was 30%, 50 g of dimethyl sulfoxide was added to the reaction vessel.

Referring to Table 1, it was confirmed that when the ratio of replacement by cyanoethyl groups was 30%, $\delta_{D2}$, $\delta_{P2}$, and $\delta_{H2}$ of Equation 1 were 15.93 MPa$^{1/2}$, 9.51 MPa$^{1/2}$, and 15.20 MPa$^{1/2}$, respectively. Meanwhile, when the ratio of replacement by cyanoethyl groups was 30%, dimethyl sulfoxide was added, and at this time, $\delta_{D1}$, $\delta_{P1}$, and $\delta_{H1}$ of Equation 1 were 16.29 MPa$^{1/2}$, 14.41 MPa$^{1/2}$, and 17.96 MPa$^{1/2}$, respectively. When these solubility parameters were put into Equation 1, it was confirmed that Ra was 5.67 and less than 6 at 30% of the ratio of replacement by cyanoethyl groups.

When the ratio of replacement by cyanoethyl groups reached 50% by continuing the cyanoethylation, 100 g of dimethyl sulfoxide was further added to the reaction vessel.

Referring to Table 1, it was confirmed that when the ratio of replacement by cyanoethyl groups was 50%, $\delta_{D2}$, $\delta_{P2}$, and $\delta_{H2}$ of Equation 1 were 15.95 MPa$^{1/2}$, 10.45 MPa$^{1/2}$, and 12.80 MPa$^{1/2}$, respectively. Further, when the ratio of replacement by cyanoethyl groups was 50%, dimethyl sulfoxide was added, and at this time, $\delta_{D1}$, $\delta_{P1}$, and $\delta_{H1}$ of Equation 1 were 16.86 MPa$^{1/2}$, 14.97 MPa$^{1/2}$, and 16.00 MPa$^{1/2}$, respectively. When these solubility parameters were put into Equation 1, it was confirmed that Ra was 5.83 and less than 6 at 50% of the ratio of replacement by cyanoethyl groups.

When the ratio of replacement by cyanoethyl groups reached 80% by continuing the cyanoethylation, 100 g of isopropyl alcohol was further added to the reaction vessel.

Referring to Table 1, it was confirmed that when the ratio of replacement by cyanoethyl groups was 80%, $\delta_{D2}$, $\delta_{P2}$, and $\delta_{H2}$ of Equation 1 were 15.98 MPa$^{1/2}$, 11.86 MPa$^{1/2}$, and 9.20 MPa$^{1/2}$, respectively. Further, when the ratio of replacement by cyanoethyl groups was 80%, isopropyl alcohol was added, and at this time, $\delta_{D1}$, $\delta_{P1}$, and $\delta_{H1}$ of Equation 1 were 17.43 MPa$^{1/2}$, 14.56 MPa$^{1/2}$, and 13.55 MPa$^{1/2}$, respectively. When these solubility parameters were put into Equation 1, it was confirmed that Ra was 5.88 and less than 6 at 80% of the ratio of replacement by cyanoethyl groups.

30 minutes later, 3 g of acetic acid was added to the reaction vessel, and 300 g of distilled water was added to precipitate a reaction product. The precipitated polymer was dissolved in 200 g of acetone, and this solution was added to 3000 g of distilled water to reprecipitate the cyanoethyl group-containing polymer. Ra values were monitored throughout the cyanoethylation to confirm that Ra values were maintained at less than 6.

COMPARATIVE EXAMPLE 1

Preparation of Cyanoethyl Group-Containing Polymer 100 g of a 7% by weight polyvinyl alcohol aqueous solution, 2 g of a 30% by weight NaOH aqueous solution, and 100 g of acrylonitrile were added to a reaction vessel, and stirred at 50° C. for 1 hour to allow cyanoethylation. When the ratio of replacement by cyanoethyl groups reached 50% by monitoring the cyanoethylation, Ra of Equation 1 was calculated, and as a result, Ra was 12.32 and more than 6.

Thereafter, 3 g of acetic acid was added to the reaction vessel, and 3000 g of distilled water was added to precipitate a reaction product. The precipitated polymer was dissolved in 200 g of acetone, and this solution was added to 3000 g of distilled water to reprecipitate the cyanoethyl group-containing polymer.

COMPARATIVE EXAMPLE 2

Preparation of Cyanoethyl Group-Containing Polymer

A cyanoethyl group-containing polymer was prepared in the same manner as in Example 1, except that when the ratio of replacement by cyanoethyl groups was 30%, 100 g of distilled water was added to the reaction vessel of Example 1, and when the ratio of replacement by cyanoethyl groups was 50%, 100 g of distilled water was added to the reaction vessel of Example 1. In Comparative Example 2, when Ra of Equation 1 was calculated when the ratio of replacement by cyanoethyl groups was 30%, Ra was 16.21, and when Ra of Equation 1 was calculated when the ratio of replacement by cyanoethyl groups was 50%, Ra was 21.24, indicating that the Ra values were more than 6.

COMPARATIVE EXAMPLE 3

Preparation of Cyanoethyl Group-Containing Polymer 100 g of polyvinyl alcohol, 10 g of NaOH, and 200 g of acrylonitrile were added to a reaction vessel, and 400 mL (316.4 g) of acetone and 300 mL of distilled water were added thereto, and then stirred at 70° C. to allow cyanoethylation.

30 minutes later, when the ratio of replacement by cyanoethyl groups was 60%, 100 mL (79.1 g) of acetone was added to continue cyanoethylation. Ra of Equation 1 was calculated before addition of acetone, and as a result, Ra was 8.41. Ra of Equation 1 was calculated after addition of acetone, and as a result, Ra was 6.99, indicating that the Ra values were more than 6.

30 minutes later, 3 g of acetic acid was added to the reaction vessel, and 3000 g of distilled water was added to precipitate a reaction product. The precipitated polymer was dissolved in 200 g of acetone, and this solution was added to 3000 g of distilled water to reprecipitate the cyanoethyl group-containing polymer.

EXPERIMENTAL EXAMPLE

Examination of Structure of Cyanoethyl Group-Containing Polymer and Evaluation of Characteristics Thereof (1) Examination of Structure of Cyanoethyl Group-Containing Polymer Contents of the repeating unit containing —OCH$_2$CH$_2$CONH$_2$ and ions thereof and the repeating unit containing —OCH$_2$CH$_2$COOH and ions thereof which are introduced into the cyanoethyl group-containing polymers prepared in the examples and comparative examples were examined by H-NMR and IR spectra, and the results are shown in Table 2. In detail, the ratios of the repeating unit containing —OCH$_2$CH$_2$CONH$_2$ and ions thereof and the repeating unit containing —OCH$_2$CH$_2$COOH and ions thereof with respect to repeating units in each polymer were calculated through the peak area that appeared at 2.2 ppm to 2.3 ppm in the H-NMR spectrum and the peak area corresponding to —COO which appeared at 1570 cm$^{-1}$ in the IR spectrum.

TABLE 2

| | —OCH$_2$CH$_2$CONH$_2$ and ions thereof | —OCH$_2$CH$_2$COOH and ions thereof |
|---|---|---|
| Example 1 | 0.4 | <0.1 |
| Example 2 | 0.4 | <0.1 |
| Example 3 | 0.3 | <0.1 |
| Example 4 | 0.7 | <0.3 |
| Comparative Example 1 | 5.2 | 3.0 |
| Comparative Example 2 | 4.2 | 7.1 |
| Comparative Example 3 | 2.1 | 2.5 |

(Unit: %)

(2) Evaluation of Characteristics of Cyanoethyl Group-Containing Polymer

Each of the cyanoethyl group-containing polymers prepared in the examples and comparative examples was mixed with inorganic particles, and dispersion force and adhesive strength thereof were evaluated. In detail, the cyanoethyl group-containing polymer was mixed with alumina having an average particle size of 0.7 μm and BET of 4 m$^2$/g at a weight ratio of 10:90 to prepare a slurry.

In order to examine the dispersion force of the cyanoethyl group-containing polymer, the prepared slurry was rotated at 200 rpm by using a LUMiSizer which is a dispersion analyzer, and a sedimentation rate of alumina was measured at 25° C., and the results are shown in Table 3 below. As the dispersion force of the cyanoethyl group-containing polymer is better, the alumina is better dispersed and settles slowly.

In order to evaluate the adhesive strength of the cyanoethyl group-containing polymer, an assembly was manufactured by adhering an electrode to one surface of a separator in the following manner, and a force required to peel the separator from the electrode was measured and is shown in Table 3 below.

In detail, artificial graphite, carbon black, CMC, and a binder at a weight ratio of 96:1:1:2 were mixed with water to prepare a negative electrode slurry. The negative electrode slurry was coated on a copper foil with a thickness of 50 μm and dried at 80° C. for 1 hour or longer, and then pressed to manufacture a negative electrode.

Thereafter, the prepared slurry of the cyanoethyl group-containing polymer and the inorganic particles was coated on one surface of a polyethylene porous substrate by using a doctor blade, and then dried to prepare a separator on which a porous coating layer was formed.

The negative electrode and the separator were adhered to each other in a lamination device, and this sample was used to measure a force which was required to peel the adhesive surface of the electrode and the separator (porous coating layer) by using a UTM at a speed of 100 mm/min.

TABLE 3

| | Sedimentation rate [μm/s] | Electrode adhesive strength [g/15 mm] |
|---|---|---|
| Example 1 | 1.5 | 69 |
| Example 2 | 1.2 | 72 |
| Example 3 | 1.2 | 80 |
| Example 4 | 3.4 | 55 |
| Comparative Example 1 | 58 | 10 |
| Comparative Example 2 | 36 | 25 |
| Comparative Example 3 | 20.5 | 32 |

Referring to Table 3, the sedimentation rates of Examples 1 to 4 were lower than those of Comparative Examples 1 to 3, indicating improvement of dispersibility of inorganic particles, and the electrode adhesive strengths of Examples 1 to 4 were higher than those of Comparative Examples 1 to 3, indicating improvement of adhesive strength of inorganic particles. Accordingly, it was confirmed that the cyanoethyl group-containing polymer having low contents of the functional groups such as —OCH$_2$CH$_2$CONH$_2$ and —OCH$_2$CH$_2$COOH may be used to achieve excellent dispersion force and adhesive strength.

What is claimed is:

1. A method of preparing a cyanoethyl group-containing polymer, the method comprising mixing a reactive functional group-containing polymer, a cyanoethyl group-introducing precursor, a basic catalyst, and a first solvent to prepare a mixture, and during a cyanoethylation of the mixture, adding a second solvent so that Ra calculated by the following Equation 1 is less than 6:

$$(Ra)^2 = 4(\delta_{D2} - \delta_{D1})^2 + (\delta_{P2} - \delta_{P1})^2 + (\delta_{H2} - \delta_{H1})^2 \quad \text{[Equation 1]}$$

in Equation 1, $\delta_{D2}$, $\delta_{P2}$, and $\delta_{H2}$ represent a solubility parameter due to a dispersion force, a solubility parameter due to a dipolar intermolecular force, and a solubility parameter due to hydrogen bonding of a mixture obtained by mixing the reactive functional group-containing polymer and the cyanoethyl group-introducing precursor at a molar ratio of 100-x:x, respectively, and x represents a ratio of replacement by a cyanoethyl groups, which is measured at any one point, and $\delta_{D1}$, $\delta_{P1}$, and $\delta_{H1}$ represent a solubility parameter due to a dispersion force, a solubility parameter due to a dipolar intermolecular force, and a solubility parameter due to hydrogen bonding of a solvent system which is used in the cyanoethylation at any one point, respectively, wherein the cyanoethyl group-containing polymer comprises 1.0% or less of a repeating unit including —OCH$_2$CH$_2$CONH$_2$ and ions thereof and 2.0% or less of a repeating unit including —OCH$_2$CH$_2$COOH and ions thereof, with respect to total repeating units included in the cyanoethyl group-containing polymer.

2. The method of claim 1, wherein the cyanoethylation is performed at a temperature of 10° C. to 60° C. for 40 minutes to 500 minutes.

3. The method of claim 1, wherein the cyanoethyl group-containing polymer is polyvinyl alcohol, and the cyanoethyl group-introducing precursor is acrylonitrile.

4. The method of claim 1, wherein an alcohol solvent, a ketone solvent, a sulfoxide solvent, or a mixed solvent thereof is added as the second solvent.

5. The method of claim 1, wherein the second solvent is added two or more times within the range of 25% to 85% of the ratio of replacement by a cyanoethyl groups.

6. The method of claim 1, wherein the second solvent is added in an amount of 30 parts by weight to 70 parts by weight with respect to 100 parts by weight of the first solvent within the range of 25% to 35% of the ratio of replacement by a cyanoethyl groups, and the second solvent is added in an amount of 30 parts by weight to 130 parts by weight with respect to 100 parts by weight of the first solvent within the range of 45% to 55% of the ratio of replacement by a cyanoethyl groups.

7. The method of claim 3, wherein the cyanoethyl group-containing polymer comprises 1.0% or less of a repeating unit represented by the following Chemical Formula 3 and 2.0% or less of a repeating unit represented by the following Chemical Formula 4, with respect to a total amount of repeating units represented by the following Chemical Formulae 1 to 4:

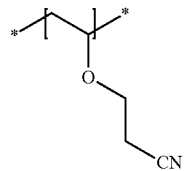

[Chemical Formula 1]

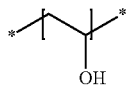

[Chemical Formula 2]

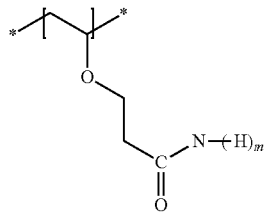

[Chemical Formula 3]

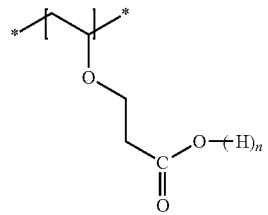

[Chemical Formula 4]

in Chemical Formulae 3 and 4, m is an integer of 1 to 3, and n is 0 or 1.

* * * * *